(12) United States Patent
Lee et al.

(10) Patent No.: US 10,224,749 B2
(45) Date of Patent: Mar. 5, 2019

(54) METHOD AND APPARATUS FOR WIRELESS POWER TRANSMISSION FOR EFFICENT POWER DISTRIBUTION

(71) Applicant: Samsung Electronics Co., Ltd., Suwon-si (KR)

(72) Inventors: Byoung Hee Lee, Yongin-si (KR); Sang Wook Kwon, Seongnam-si (KR); Ki Young Kim, Yongin-si (KR); Dong Zo Kim, Yongin-si (KR); Bong Chul Kim, Seoul (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1035 days.

(21) Appl. No.: 14/452,964

(22) Filed: Aug. 6, 2014

(65) Prior Publication Data
US 2015/0042173 A1    Feb. 12, 2015

(30) Foreign Application Priority Data
Aug. 8, 2013 (KR) .......................... 10-2013-0094310

(51) Int. Cl.
*H02J 50/12*        (2016.01)
*H01F 38/14*        (2006.01)
(Continued)

(52) U.S. Cl.
CPC ............ *H02J 50/12* (2016.02); *B60L 11/182* (2013.01); *H01F 38/14* (2013.01); *H02J 5/005* (2013.01); *H02J 7/025* (2013.01); *H02J 17/00* (2013.01); *H02J 50/60* (2016.02); *H02J 50/80* (2016.02); *H02M 7/06* (2013.01); *B60L 2210/10* (2013.01); *B60L 2210/30* (2013.01);
(Continued)

(58) Field of Classification Search
None
See application file for complete search history.

(56) References Cited

U.S. PATENT DOCUMENTS

| | | | | |
|---|---|---|---|---|
| 2010/0109443 A1* | 5/2010 | Cook | .................. | H01Q 1/2225 |
| | | | | 307/104 |
| 2012/0248891 A1* | 10/2012 | Drennen | ................. | H02J 5/005 |
| | | | | 307/104 |
| 2013/0029595 A1* | 1/2013 | Widmer | ............... | H04B 5/0031 |
| | | | | 455/39 |

FOREIGN PATENT DOCUMENTS

| | | |
|---|---|---|
| KR | 10-2012-0064082 A | 6/2012 |
| KR | 10-2012-0066281 A | 6/2012 |
| KR | 10-2012-0134079 A | 12/2012 |

\* cited by examiner

*Primary Examiner* — Thienvu Tran
*Assistant Examiner* — David M Stables
(74) *Attorney, Agent, or Firm* — Sughrue Mion, PLLC

(57) ABSTRACT

A wireless power transmission apparatus includes a communicator configured to receive information associated with a reference power of a wireless power reception apparatus and information associated with a power measured at an input terminal of a direct current-to-direct current (DC/DC) converter of the wireless power reception apparatus, a controller configured to control an output power based on the information associated with the reference power and the information associated with the power measured, and a source resonator configured to transmit the output power to the wireless power reception apparatus by resonating with a target resonator.

10 Claims, 12 Drawing Sheets

(51) Int. Cl.
  *H02J 5/00*     (2016.01)
  *B60L 11/18*    (2006.01)
  *H02J 7/02*     (2016.01)
  *H02M 7/06*     (2006.01)
  *H02J 50/60*    (2016.01)
  *H02J 50/80*    (2016.01)
  *H02J 17/00*    (2006.01)

(52) U.S. Cl.
  CPC ........ *Y02T 10/7005* (2013.01); *Y02T 10/7072* (2013.01); *Y02T 10/7216* (2013.01); *Y02T 10/7241* (2013.01); *Y02T 90/122* (2013.01); *Y02T 90/127* (2013.01); *Y02T 90/14* (2013.01); *Y02T 90/16* (2013.01)

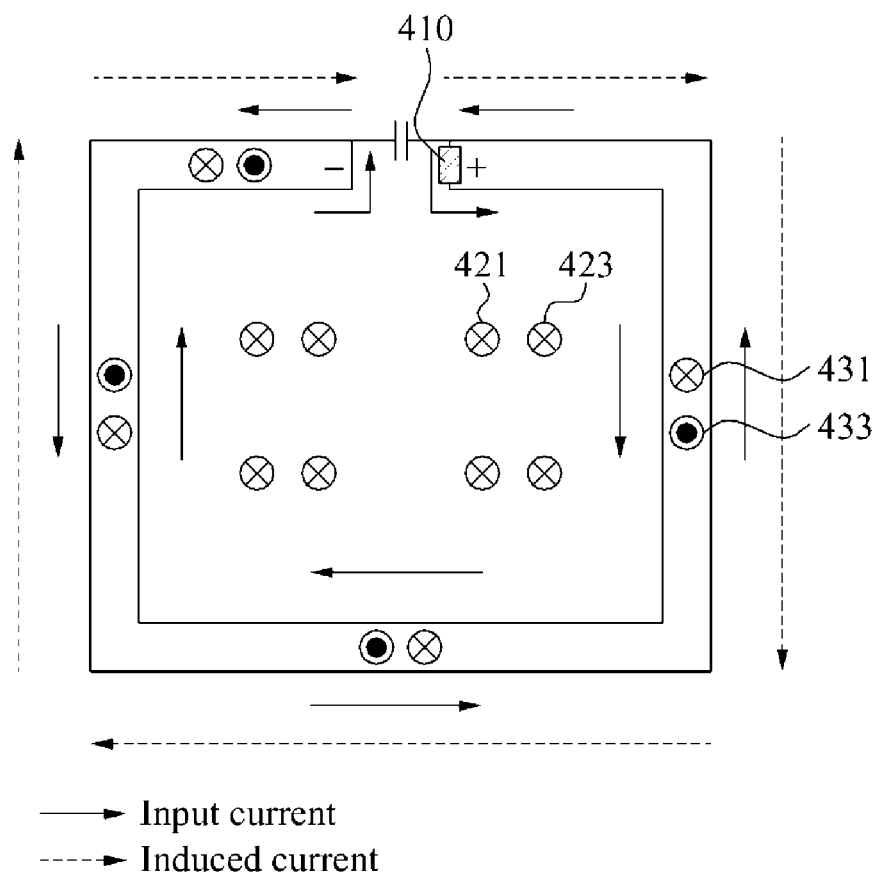

METHOD AND APPARATUS FOR WIRELESS POWER TRANSMISSION FOR EFFICENT POWER DISTRIBUTION

CROSS-REFERENCE TO RELATED APPLICATIONS

This application claims the benefit under 35 USC 119(a) of Korean Patent Application No. 10-2013-0094310 filed on Aug. 8, 2013, in the Korean Intellectual Property Office, the entire disclosure of which is incorporated herein by reference for all purposes.

BACKGROUND

1. Field

The following description relates to a method and an apparatus for wireless power transmission for efficient power distribution.

2. Description of Related Art

Wireless power is energy transmitted to a wireless power reception apparatus from a wireless power transmission apparatus via magnetic coupling. Accordingly, a wireless power charging system includes a source device for wirelessly transmitting power and a target device for wirelessly receiving power. The source device may be referred to as a wireless power transmission apparatus. Also, the target device may be referred to as a wireless power reception apparatus.

The source device includes a source resonator, and the target device includes a target resonator. Magnetic coupling or resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus includes a communicator configured to receive information associated with a reference power of a wireless power reception apparatus and information associated with an amount of power measured at an input terminal of a direct current-to-direct current (DC/DC) converter of the wireless power reception apparatus; a controller configured to control an output power based on the information associated with the reference power and the information associated with the amount of power measured; and a source resonator configured to transmit the output power to the wireless power reception apparatus by resonating with a target resonator.

The controller may be further configured to control the output power so that the reference power is equal to the amount of power measured.

The information associated with the reference power may include information associated with a reference voltage and a reference current; and the information associated with the amount of power measured may include information associated with a measured voltage and a measured current.

The controller may include an output voltage controller configured to control an output voltage so that the reference voltage is equal to the measured voltage; and an output current controller configured to control an output current so that the reference current is equal to the measured current.

There may be a plurality of wireless power reception apparatuses; and the controller may be further configured to distribute a total power output to the plurality of wireless power reception apparatuses based on the information associated with the reference power and the information associated with the amount of power measured received from each of the plurality of apparatuses.

The information associated with the amount of power measured may be measured between a rectifier of the wireless power reception apparatus and the DC/DC converter.

In another general aspect, a wireless power reception apparatus includes a power receiver configured to receive power from a target resonator configured to resonate with a source resonator; a direct current-to-direct current (DC/DC) converter configured to convert the received power; a power information measurer configured to measure, at an input terminal of the DC/DC converter, information associated with an amount of the received power; a controller configured to set information associated with a reference power; and a communicator configured to transmit the information associated with the reference power and the information associated with the amount of power measured to a wireless power transmission apparatus.

The information associated with the reference power may include information associated with a reference voltage and a reference current; and the information associated with the amount of power measured may include information associated with a measured voltage and a measured current.

The power measurer may include a voltage measurer configured to measure a voltage of the received power; and a current measurer configured to measure a current of the received power.

The controller may be further configured to set the information associated with the reference power based on information associated with a predetermined required power including information associated with a predetermined required voltage and a predetermined required current.

The controller may be further configured to set the reference voltage within a threshold range determined by a selected ratio based on the predetermined required voltage.

The controller may be further configured to set the reference current so that the reference power is within a predetermined threshold range of the required power.

The predetermined required voltage may be variable; and the controller may be further configured to set the reference voltage based on a predetermined voltage difference between the reference voltage and the predetermined required voltage.

The controller may be further configured to set the reference current so that the reference power is within a predetermined threshold range of the required power.

The apparatus may further include a rectifier configured to rectify the received power and provide the rectified power to the DC/DC converter; and the power information measurer may be further configured to measure the information associated with the amount of the received power between the rectifier and the DC/DC converter.

In another general aspect, a wireless power transmission method includes receiving information associated with a reference power of a wireless power reception apparatus and information associated with an amount of power measured at an input terminal of a direct current-to-direct current (DC/DC) converter of the wireless power reception apparatus; controlling an output power based on the information associated with the reference power and the information associated with the amount of power measured; and transmitting the output power to the wireless power reception apparatus by resonating with a target resonator.

The information associated with the amount of power measured may be measured between a rectifier of the wireless power reception apparatus and the DC/DC converter.

There may be a plurality of wireless power reception apparatuses; and the controlling of the output power may include distributing a total power output to the plurality of wireless power reception apparatuses based on the information associated with the reference power and the information associated with the amount of power measured received from each of the plurality of wireless power reception apparatuses.

In another general aspect, a wireless power transmission apparatus includes a communicator configured to receive information associated with an operating efficiency of a wireless power reception apparatus; a controller configured to control an output power to increase the operating efficiency of the wireless power reception apparatus based on the information associated with the operating efficiency of the wireless power reception apparatus; and a source resonator configured to transmit the output power to the wireless power reception apparatus by resonating with a target resonator.

The information associated with the operating efficiency of the wireless power reception apparatus may include information associated with a desired state of the wireless power reception apparatus; and information associated with a current state of the wireless power reception apparatus; wherein the controller may be further configured to control the output power to reduce a difference between the desired state of the wireless power reception apparatus and the current state of the wireless power reception apparatus to increase the operating efficiency of the wireless power reception apparatus.

The desired state of the wireless power reception apparatus may include any one or any combination of a desired power to be received by the wireless power reception apparatus, a desired voltage to be received by the wireless power reception apparatus, and a desired current to be received by the wireless power reception apparatus; and the current state of the wireless power reception apparatus may include any one or any combination of a power currently being received by the wireless power reception apparatus, a voltage currently being received by the wireless power reception apparatus, and a current currently being received by the wireless power reception apparatus.

The desired state of the wireless power reception apparatus may be a desired state at an input terminal of a direct current-to-direct current (DC/DC) converter; and the current state of the wireless power reception apparatus may be a current state measured at the input terminal of the DC/DC converter.

Other features and aspects will be apparent from the following detailed description, the drawings, and the claims.

BRIEF DESCRIPTION OF THE DRAWINGS

FIG. 4A illustrates an example of a distribution of a magnetic field inside a resonator produced by feeding a feeder.

DETAILED DESCRIPTION

Figure 1:
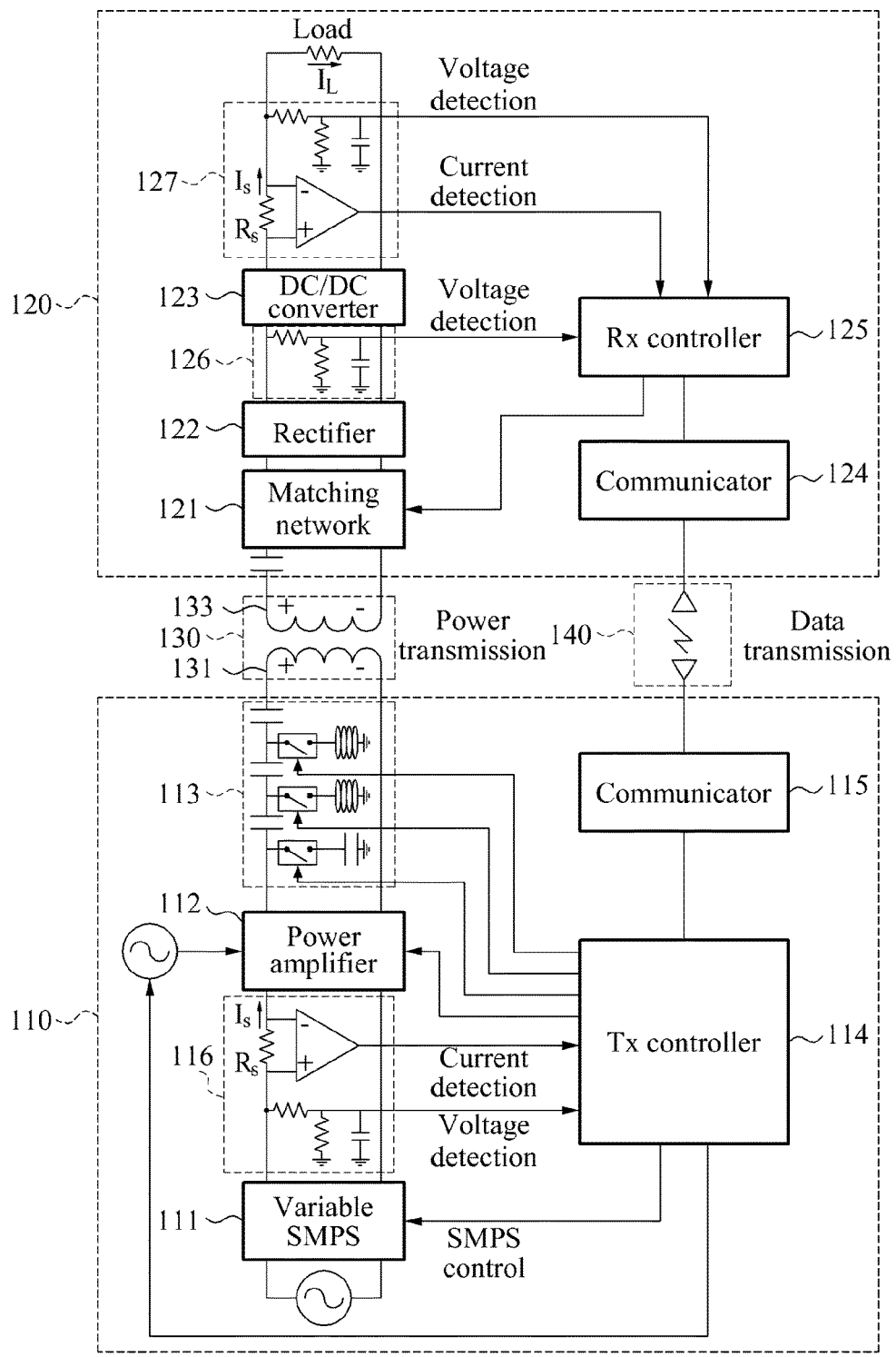
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission and reception system.

Referring to FIG. 1, the wireless power transmission and reception system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communicator 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be needed. In this example, the fixed SMPS outputs a fixed DC voltage to the variable DC/DC converter, and the variable DC/DC converter controls its output voltage supplied to the PA 112 based on the level of the power output from the PA 112 so that the PA 112 may operate in the saturation region with a high efficiency at all times, thereby enabling the maximum efficiency to be maintained at all levels of the output power of the PA 112.

The power detector 116 detects an output current and an output voltage of the variable SMPS 111, and transmits, to the Tx controller 114, information on the detected output current and the detected output voltage. Also, the power detector 116 may detect an input current and an input voltage of the PA 112.

The PA 112 generates power by converting a DC voltage having a predetermined level supplied to the PA 112 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is transmitted using a resonant frequency of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. In particular, the inverter may convert the DC power by converting a DC voltage having a predetermined level to an AC voltage using a switching pulse signal having a frequency in a band of tens of kHz to hundreds of kHz. For example, the inverter may convert the DC voltage having predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may include, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a level of an output voltage of the source resonator 131 or the PA 112 and a voltage level of the reflected wave. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N number tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the Tx controller 114 may transmit a variety of data to the target 120 using in-band communication. The Tx controller 114 may also detect a reflected wave, and demodulate a signal received from the target 120 from an envelope of the detected reflected wave.

The Tx controller 114 may generate a modulated signal for in-band communication using various methods. For example, the Tx controller 114 may generate the modulated signal by turning the switching pulse signal used by the PA 112 on or off, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to sense a change in a temperature of the source 110. The source 110 may receive from the target 120 information regarding the battery state of the target 120, the change in the amount of power received by the target 120, and/or the change in the temperature of the target 120 by communicating with the target 120. The source 110 may detect the change in the temperature of the target 120 based on the data received from the target 120.

The Tx controller 114 may adjust a voltage supplied to the PA 112 using a lookup table (LUT). The LUT may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communicator 115 may perform out-of-band communication using a separate communication channel. The communicator 115 may include a communication module, such as a ZigBee module, a Bluetooth module, or any other communication module known to one of ordinary skill in the art that the communicator 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. Also, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communicator 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive the data from the source 110 using in-band communication.

The target resonator 133 may receive the initial wireless power determined by the Tx controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. The detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required for the load and the amount of power actually transferred to the load.

If the amount of the power actually transferred to the load calculated by the Rx controller 125 is transmitted to the source 110 by the communicator 124, the Tx controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received using the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the TX controller 114 of the source 110. Depending on whether the reflected wave is detected, the Tx controller 114 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communicator 124 of the target may transmit a response message to the communicator 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communicator 124 may perform out-of-band communication using a separate communication channel. For example, the communicator 124 may include a communication module, such as a ZigBee module, a Bluetooth module, or any other communication module known to one of ordinary skill in the art that communicator 124 may use to transmit and receive the data 140 to and from the source 110 using the out-of-band communication.

The communicator 124 may receive a wake-up request message from the source 110, and the power detector 127 may detect an amount of power received by the target resonator 133. The communicator 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The source 110 and the target 120 of FIG. 1 may correspond to a wireless power transmission apparatus and a wireless power reception apparatus to be described hereinafter.

In the following description of FIGS. 2A though 4B, unless otherwise indicated, the term "resonator" may refer to both a source resonator and a target resonator. The resonator of FIGS. 2A through 4B may be used as the resonators described with respect to FIGS. 1 and 5 through 9.

Figure 2A:
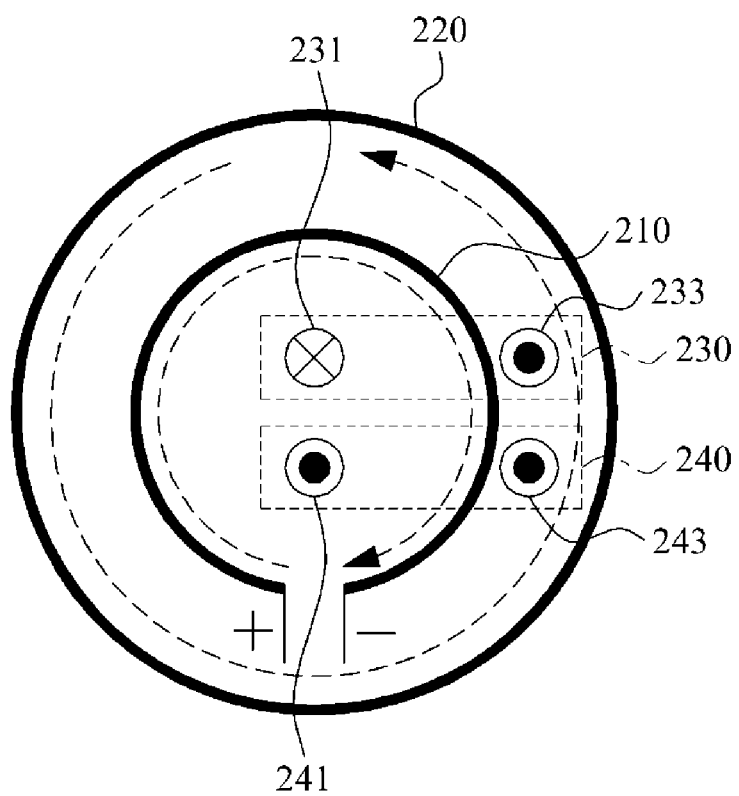
FIGS. 2A and 2B illustrate examples of a distribution of a magnetic field in a resonator and a feeder.
Figure 2B:
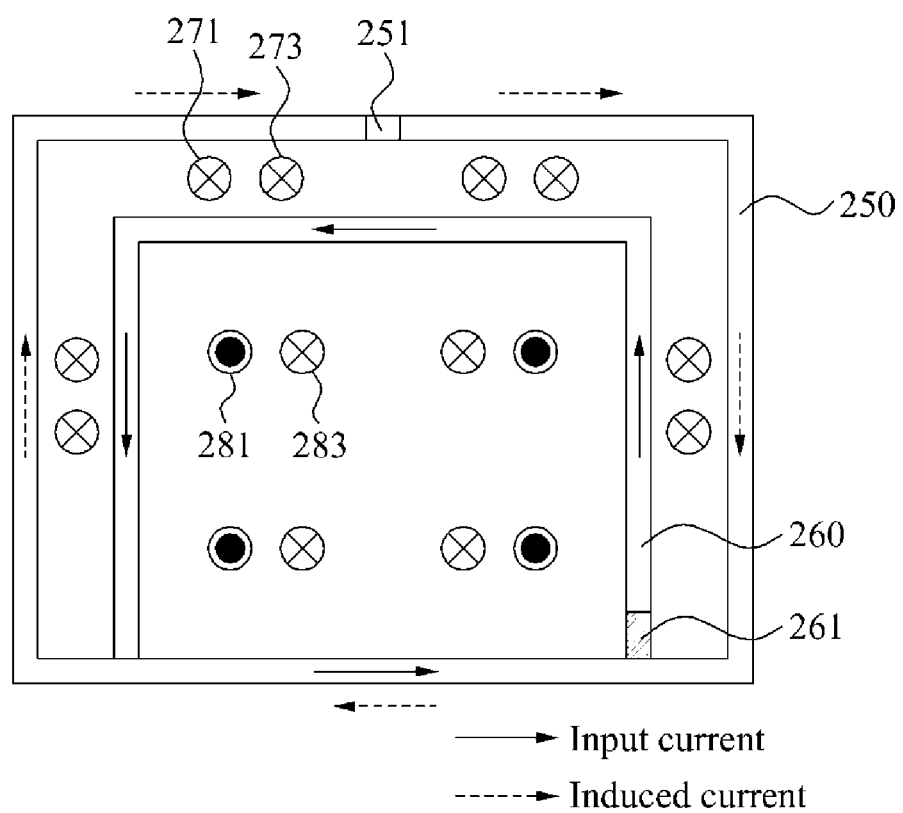

FIGS. 2A and 2B illustrate examples of a distribution of a magnetic field in a resonator and a feeder.

When power is supplied to a resonator through a separate feeder, a magnetic field is generated in both the feeder and the resonator.

A source resonator and a target resonator may each have a double loop structure including an external loop and an internal loop.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 240 generated by the feeder 210 and the magnetic field 240 generated by the resonator 220 are combined, a strength of a total magnetic field decreases inside the feeder 210, but increases outside the feeder 210. Accordingly, when power is supplied to the resonator 220 via the feeder 210 configured as illustrated in FIG. 2, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Also, an average wireless power transmission efficiency in the resonator 220 may decrease because the wireless power transmission increases when the strength of the total magnetic field increases, and decreases when the strength of the total magnetic field decreases.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Also, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a strength of the total magnetic field increases because a direction 271 of the magnetic field generated by the input current is the same as a direction 273 of the magnetic field generated by the induced current. Conversely, inside the feeder 260, the strength of the total magnetic field decreases because a direction 281 of the magnetic field generated by the input current is opposite to a direction 283 of the magnetic field generated by the induced current. Therefore, the strength of the total magnetic field decreases in the portion of the resonator 250 inside the feeder 260, but decreases in the portion of the resonator 250 outside the feeder 260.

An input impedance may be adjusted by adjusting an internal area of the feeder 260. The input impedance is an impedance viewed in a direction from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance may vary based on a position of a target even if the internal area of the feeder 260 has been adjusted to adjust the input impedance to match an output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
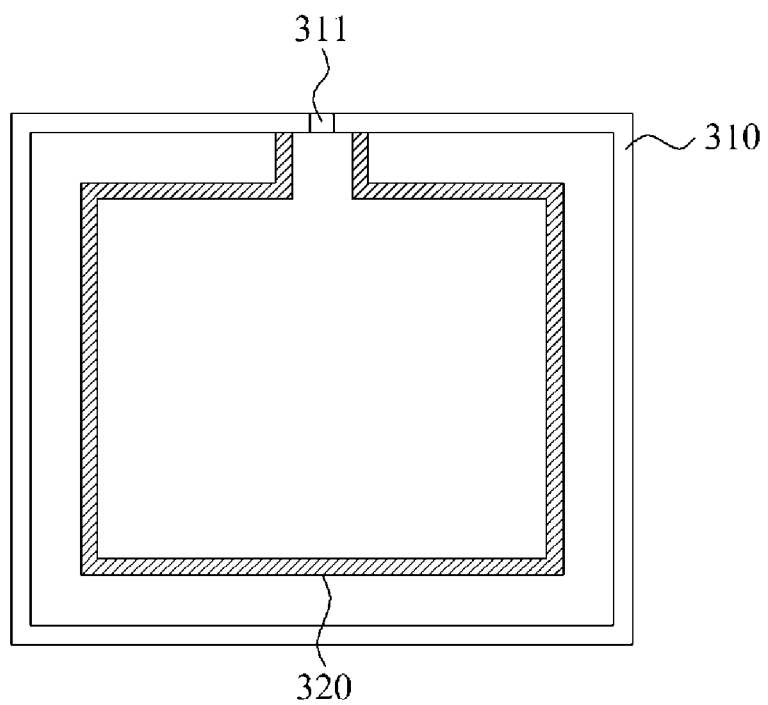
FIGS. 3A and 3B illustrate an example of a configuration of a resonator and a feeder.
Figure 3B:
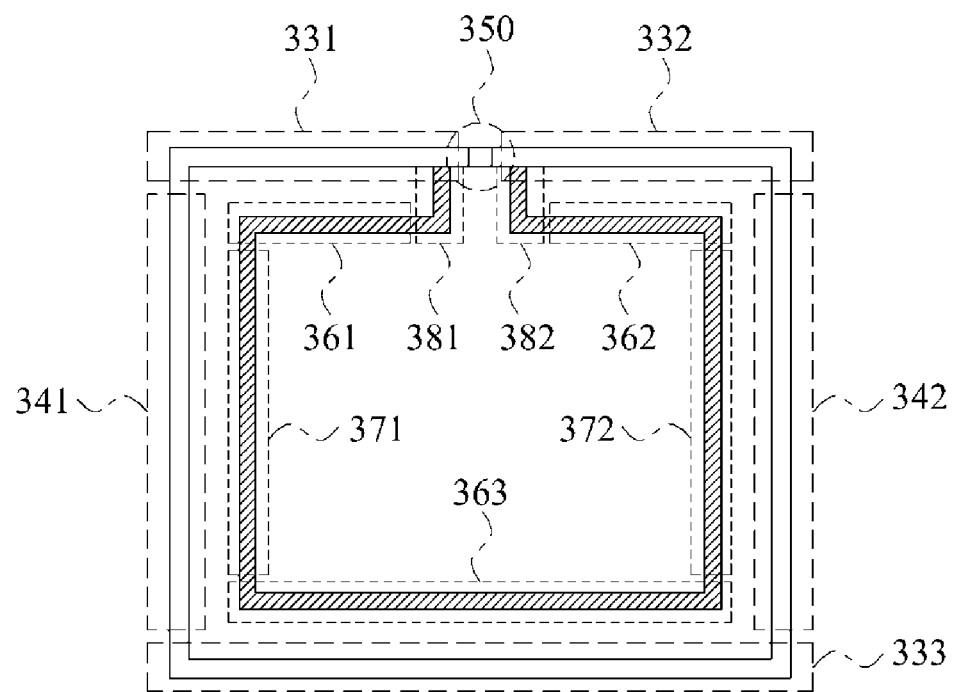

FIGS. 3A and 3B illustrate an example of a configuration of a resonator and a feeder.

Referring to FIG. 3A, a resonator 310 includes a capacitor 311. A feeder 320 is electrically connected to both ends of the capacitor 311.

FIG. 3B illustrates a structure of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As shown in FIG. 3B, the resonator has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 333 and the second signal conducting portion 332.

Also, as shown in FIG. 3B, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electromagnetic characteristic that is not found in nature, and thus may have an artificially designed structure. All materials existing in nature have a permittivity and a magnetic permeability, and most materials have a permittivity and a positive magnetic permeability.

In the case of most materials, a right-hand rule may be applied to an electric field, a magnetic field, and a Poynting vector, so the corresponding materials may be referred to as right-handed materials (RHMs). However, a metamaterial having a permittivity and/or a magnetic permeability not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and the capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency of the MNG resonator 310 is independent of a physical size of the MNG resonator 310. The resonant frequency of the MNG resonator 310 having the zeroth-order characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, as shown in FIG. 3B, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field inside the resonator 310 to increase inside the feeder 320, and decrease outside the feeder 320.

An input impedance is determined by an area of a region between the resonator 310 and the feeder 320. Accordingly, a separate matching network used to match the input impedance to output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 310 has a circular structure, the feeder 320 may also have a circular structure.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIG. 3B will be used in the following description of FIG. 4A for ease of description.

A feeding operation may be an operation of supplying power to a source resonator in wireless power transmission, or an operation of supplying an AC power to a rectifier in the wireless power transmission. FIG. 4A illustrates a direction of an input current flowing in the feeder 320, and a direction of an induced current induced in the resonator 310 operating as a source resonator. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 of FIG. 3B may be used as an input port 410. In the example in FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 381 of the feeder 320 is connected to the first signal conducting portion 331 of the resonator 310, and the second signal conducting portion 332 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, in a region between the feeder 320 and the resonator 310, a direction 433 of the magnetic field generated by the input current flowing in the feeder 320 is opposite to a direction 431 of the magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in a center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the induced current in the resonator 310 flows in the same direction as the input current in the feeder 320, the strength of the total magnetic field increases inside the feeder 320, and decreases outside the feeder 320. As a result, due to the feeder 320, the strength of the magnetic field increases in the center of the resonator 310 having the loop structure, and decreases near the outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the magnetic field may be constant inside the resonator 310.

A wireless power transmission efficiency of transmitting power from a source resonator to a target resonator is proportional to the strength of the total magnetic field generated in the source resonator. Accordingly, when the strength of the total magnetic field increases in the center of the source resonator, the wireless power transmission efficiency also increases.

Figure 4B:
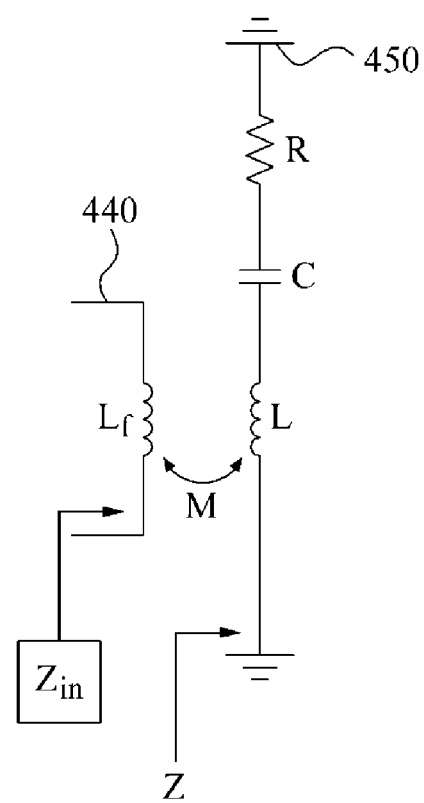
FIG. 4B illustrates an example of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, ω denotes a resonant frequency between the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In a target resonator and a feeder of a wireless power reception apparatus, a magnetic field may be distributed as illustrated in FIG. 4A. For example, the target resonator may receive wireless power from a source resonator via magnetic coupling with the source resonator. The received wireless power induces a current in the target resonator. The induced current in the target resonator generates a magnetic field, which induces a current in the feeder. If the target resonator is connected to the feeder as illustrated in FIG. 4A, the induced current in the target resonator will flow in the same direction as the induced current in the feeder. Accordingly, for the reasons discussed above in connection with FIG. 4A, the strength of the total magnetic field will increase inside the feeder, but will decrease in a region between the feeder and the target resonator.

Figure 5:
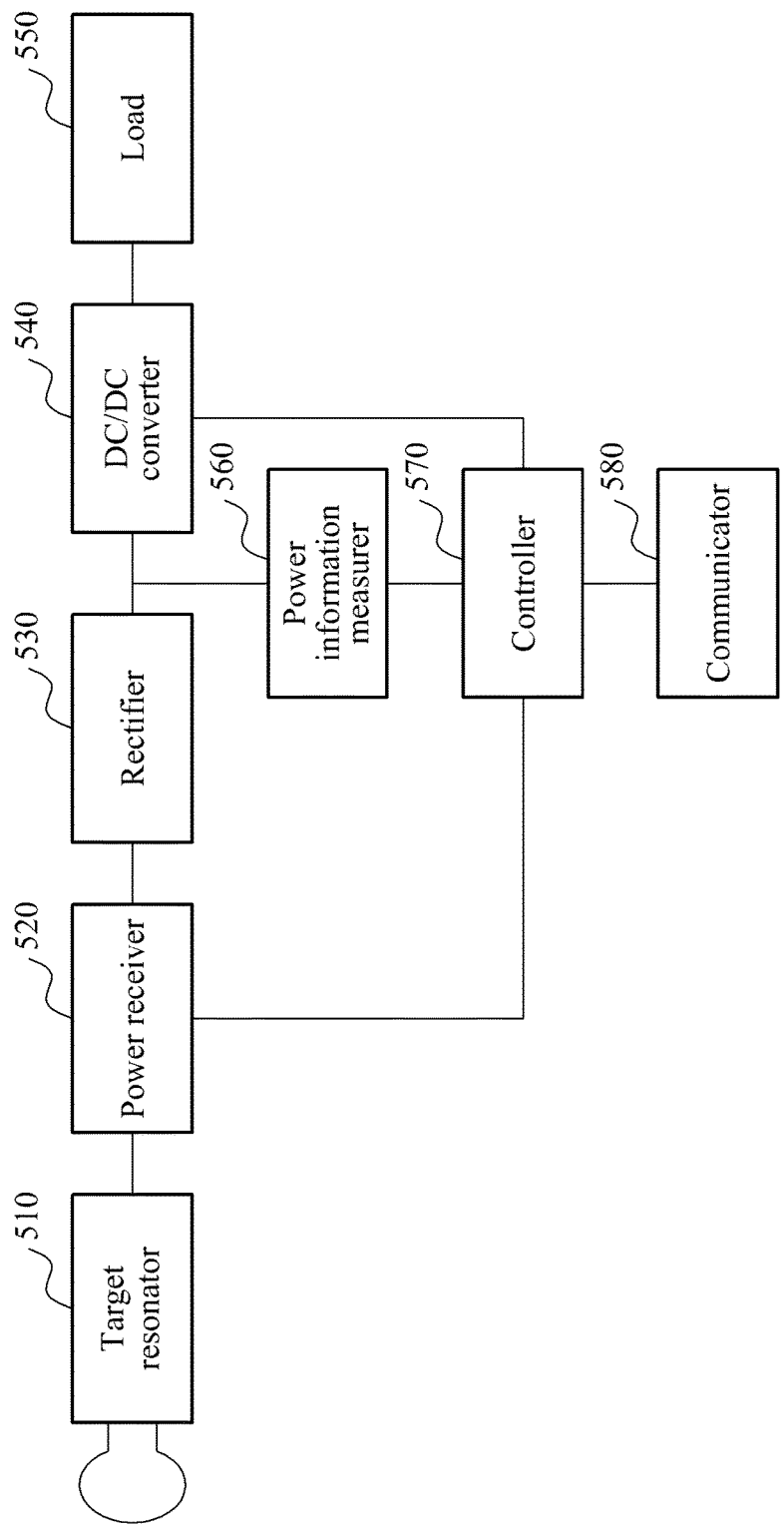
FIG. 5 illustrates an example of a wireless power reception apparatus.

FIG. 5 illustrates an example of a wireless power reception apparatus.

Referring to FIG. 5, the wireless power reception apparatus includes a target resonator 510, a power receiver 520, a rectifier 530, a DC/DC converter 540, a load 550, a power information measurer 560, a controller 570, and a communicator 580.

The target resonator 510 wirelessly receives a power from a source resonator through mutual resonance with the source resonator. When resonant frequencies of the target resonator 510 and the source resonator are equal to one another, mutual resonance may occur the target resonator 510 and the source resonator. Power stored in the source resonator is transmitted to the target resonator 510 through the mutual resonance. The target resonator 510 may be included in the wireless power reception apparatus, or may be physically separated from the wireless power reception apparatus. The target resonator 510 may be made of a superconducting material.

The power receiver 520 receives a power from the target resonator 510. The power receiver 520 and the target resonator 510 may be physically separated as shown in FIG. 5. Alternatively, although not illustrated in FIG. 5, the power receiver 520 may include the target resonator 510. The power receiver 520 may include, for example, a matching circuit like the matching circuit 121 in FIG. 1.

The rectifier 530 converts an AC voltage induced in the target resonator 510 to a DC voltage.

The DC/DC converter 540 converts a level of the DC voltage converted by the rectifier 530 to a level of a DC voltage required for either one or both of charging and operating the load 550. The DC/DC converter 540 may raise the level of the DC voltage to a level of a voltage necessary for a rated voltage of the load 550. Also, the DC/DC converter 540 may convert a current at a predetermined voltage, and convert the DC voltage converted in the rectifier 530 to a power necessary for the rated voltage of the load 550.

The load 550 may be a battery requiring energy charging or a device operating in real time For example, the real-time operating device may be a television (TV), an audio system, or an automated external defibrillator. The load 550 may be included as a basic configuration of the wireless power reception apparatus, or provided separately from the wireless power reception apparatus as an additional configuration.

The power information measurer 560 measures information associated with the power received by the wireless power reception apparatus. The information associated with the received power may include information associated with a voltage and a current of the received power.

The power information measurer 560 measures the information associated with the power received by the wireless power reception apparatus between the rectifier 530 and the DC/DC converter 540. Accordingly, the power information measurer 560 may measure an amount of power actually received by the wireless power reception apparatus.

The DC/DC converter 540 converts the power received from the wireless power reception apparatus for charging of the load 550. For example, the DC/DC converter 540 may convert the received power into a power necessary for the rated power of the load 550 by changing a current at a predetermined voltage. An overvoltage or an overcurrent may occur in a wireless power transmission apparatus when the wireless power transmission apparatus transmits a power based on a power transferred to the load 550 because the power actually received by the wireless power reception apparatus may differ from the power transferred to the load 550. Also, a computation amount, an operation amount, an information storage amount, and factors may increase because additional information such as a distance from the wireless power reception apparatus, a change in a wireless power transmission efficiency due to the presence of foreign materials between the wireless power transmission apparatus and the wireless power reception apparatus, and a coupling coefficient may be evaluated in order for the wireless power transmission apparatus to transmit the power based on the power transferred to the load 550.

When the wireless power transmission apparatus transmits the power based on the power actually received by the wireless power reception apparatus, an overvoltage or an overcurrent may not occur in the wireless power reception apparatus because only an amount of power that is receivable by the wireless power reception apparatus is transmitted. In this instance, the distance from the wireless power reception apparatus, the change in the wireless power transmission efficiency due to the presence of foreign materials, and the coupling coefficient may not need to be evaluated, and thus the computation amount, the operation amount, the information storage amount, and the other factors may decrease.

The power information measurer 560 may include a voltage measurer (not shown) to measure a voltage of the received power and a current measurer (not shown) to measure a current of the received power.

The voltage measurer (not shown) may measure the amount of voltage of the power received from the wireless power transmission apparatus using a voltage distribution circuit, a voltage detection sensor, or any other device capable of measuring voltage.

The current measurer (not shown) may measure the amount of current of the power received from the wireless power transmission apparatus using a Hall-effect sensor, a current detection sensor, or any other capable of measuring current.

The controller 570 sets information associated with a reference power. In this example, the reference power may be a reference value of the power received by the wireless power reception apparatus. When the wireless power transmission apparatus receives the reference power, an operating efficiency of the wireless power reception apparatus may increase. The information associated with the reference power may include information associated with a reference voltage and a reference current.

The controller 570 may set the information associated with the reference power based on information associated with a predetermined required power. In this example, the required power may be a power required by the wireless power reception apparatus to transfer a power to the load 550. The predetermined required power may be set based on the required power of the load 550 and the power transferred to the load 550. The information associated with the predetermined required power may include information associated with a predetermined required voltage and a predetermined required current.

The controller 570 may set a reference voltage within a threshold range to be determined by a selected ratio based on the predetermined required voltage. When the selected ratio is set to be excessively high, the operating efficiency of the wireless power reception apparatus may decrease. Accordingly, the selected ratio may be set corresponding to a characteristic of the wireless power reception apparatus. For example, when the predetermined required voltage is 1 volt (V), and the selected ratio is in a range of 100% to 150%, the threshold range may be determined to be in a range of 1 V to 1.5 V. The controller 570 may set a voltage value within the threshold range of 1 V to 1.5 V to be the reference voltage.

Also, the predetermined required voltage may vary based on the characteristic of the wireless power reception apparatus. In this example, the controller 570 may set the reference voltage based on a predetermined voltage difference between the reference voltage and the predetermined required voltage. Accordingly, although the predetermined required voltage may be variable, a maximum voltage difference between the reference voltage and the predetermined required voltage may be limited. In particular, the greater the voltage difference between the power received from the wireless power transmission apparatus and the predetermined required power, the lower the operating efficiency of the wireless power reception apparatus, and the greater a voltage stress on the elements of the wireless power reception apparatus. Conversely, the smaller the voltage difference between the power received from the wireless power transmission apparatus and the predetermined required power, the higher the operating efficiency of the wireless power reception apparatus, and the lower a voltage stress on the elements of the wireless power reception apparatus.

For example, based on a charging status, the predetermined required voltage may be changed to be in a range of 3 V to 5 V, and the predetermined voltage difference may be set to 0.5 V. Accordingly, when the predetermined required voltage is 3 V, the controller 570 may set the reference voltage to 3.5 V, and when the predetermined required voltage is 5 V, the reference voltage may be set to 5.5 V.

Also, the controller 570 may set the reference current for the reference power to be within a predetermined threshold range of the required power. The reference power may be calculated by multiplying the reference voltage and the reference current. When the reference power is within the predetermined threshold range of the required power, and the reference voltage is predetermined, the reference current may be calculated from the threshold range of the required power and the reference voltage using Ohm's law. For example, when the required power is 5 W, and the predetermined threshold range of the required power is in a range of 100% to 110% of the required power, the reference power may be set to be a power value in a range of 5 W to 5.5 W. In this example, when the reference voltage is determined to be 5 V based on the aforementioned method, the controller 570 may set a current value in a range of 1 amp (A) to 1.1 A to be the reference current.

The communicator 580 transmits the information associated with the reference power and the information associated with the amount of power measured to the wireless power transmission apparatus. Accordingly, the communicator 580 may transmit information associated with any one or any combination of the reference power, the reference voltage, and the reference current, and information associated with any one or any combination of the amount of power measured, the amount of voltage measured, and the amount of current measured. The information associated with the reference power, voltage, or current and the information associated with the amount of power, voltage, or current measured are information associated with the operating efficiency of the wireless power reception apparatus.

Figure 6:
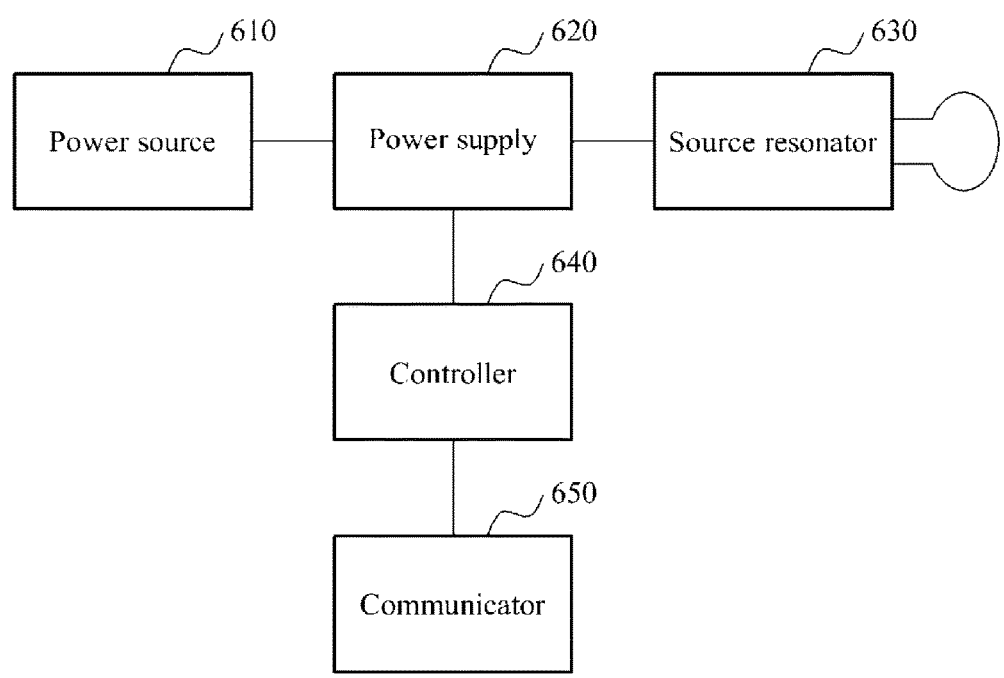
FIG. 6 illustrates an example of a wireless power transmission apparatus.

FIG. 6 illustrates an example of a wireless power transmission apparatus.

Referring to FIG. 6, the wireless power transmission apparatus includes a power source 610, a power supply 620, a source resonator 630, a controller 640, and a communicator 650.

The power supply 620 supplies a power to the source resonator 630. The power supply 620 receives the power from the power source 610. In this instance, the supplied power may be a DC power or an AC power. Although the power source 610 is illustrated as being separate from the power supply 620 in FIG. 6, the power source 610 may be included in the power supply 620.

The power supply 620 may include an AC/DC converter and a power amplifier (PA) (not illustrated). The AC/DC converter may convert an AC voltage output from the power source 610 to a DC voltage. The AC/DC converter may include a switching mode power supply (SMPS). Also, the AC/DC converter may operate as an analog-to-digital converter (ADC).

The PA may convert the DC voltage converted in the AC/DC converter to the AC voltage using a resonant frequency, and amplify an amplitude of the converted AC voltage. In this example, the resonant frequency may be a frequency at which a mutual resonance occurs between a source resonator and a target resonator. The PA may amplify the amplitude of the AC voltage based on a wireless power transmission efficiency.

The source resonator 630 transmits a power output to the wireless power transmission apparatus through mutual resonance with the target resonator. The source resonator 630 may be made of a superconducting material.

The communicator 650 receives information associated with a reference power of a wireless power reception apparatus and information associated with an amount of power measured at an input terminal of a DC/DC converter included in the wireless power reception apparatus, more particularly, measured between a rectifier included in the wireless power reception apparatus and the DC/DC converter. Accordingly, the communicator 650 may receive information associated with any one or any combination of a reference power, a reference voltage, and a reference current, and information associated with any one or any combination of an amount of power measured, an amount of voltage measured, and an amount of current measured.

The controller 640 controls an output power based on the information associated with the reference power and the information associated with the amount of power measured. The controller 640 may compare the reference power with the amount of power measured, and control the output power so that the reference power is equal to the amount of power measured. The controller 640 may control the power supply 620 to control the output power. The controller 640 may change an operation frequency of a wireless power transmission and reception system, change a resonant frequency, and change an impedance to control the output power.

Also, the controller 640 may include an output voltage controller to control an output voltage so that the reference voltage is equal to the amount of voltage measured, and an output current controller to control an output current so that the reference current is equal to the amount of current measured. Thus, by controlling the output voltage and the output current, the controller 640 may control the output power so that the reference power is equal to the amount of power measured.

When the reference power is equal to the amount of power measured, the controller 640 maintains the output power. Alternatively, when the reference power is not equal to the amount of power measured, the controller 640 controls the output power so that the reference power is equal to the amount of power measured.

Also, when the wireless power transmission apparatus does not transmit a power to the wireless power reception apparatus, for example, when the wireless power reception apparatus exceeds a charging range, or when charging of the wireless power reception apparatus is completed, the wireless power transmission apparatus may be in a standby state. In a subsequent step, when the wireless power reception apparatus is recognized, the communicator 650 of the wireless power transmission apparatus may receive the information associated with the reference power and the information associated with the amount of power measured from the wireless power reception apparatus, and the controller 640 may control the output power based on the information associated with the reference power and the information associated with the amount of power measured.

Also, there may be a plurality of wireless power reception apparatuses, When the plurality of wireless power reception apparatuses receive a power from the wireless power transmission apparatus, the wireless power transmission apparatus may receive the information associated with the reference power and the information associated with the amount of power measured from the plurality of wireless power reception apparatuses. The controller 640 may distribute a total power output to the plurality of wireless power reception apparatuses based on the information associated with the reference power received from the plurality of wireless power reception apparatuses and the information associated with the amount of power measured.

Figure 7:
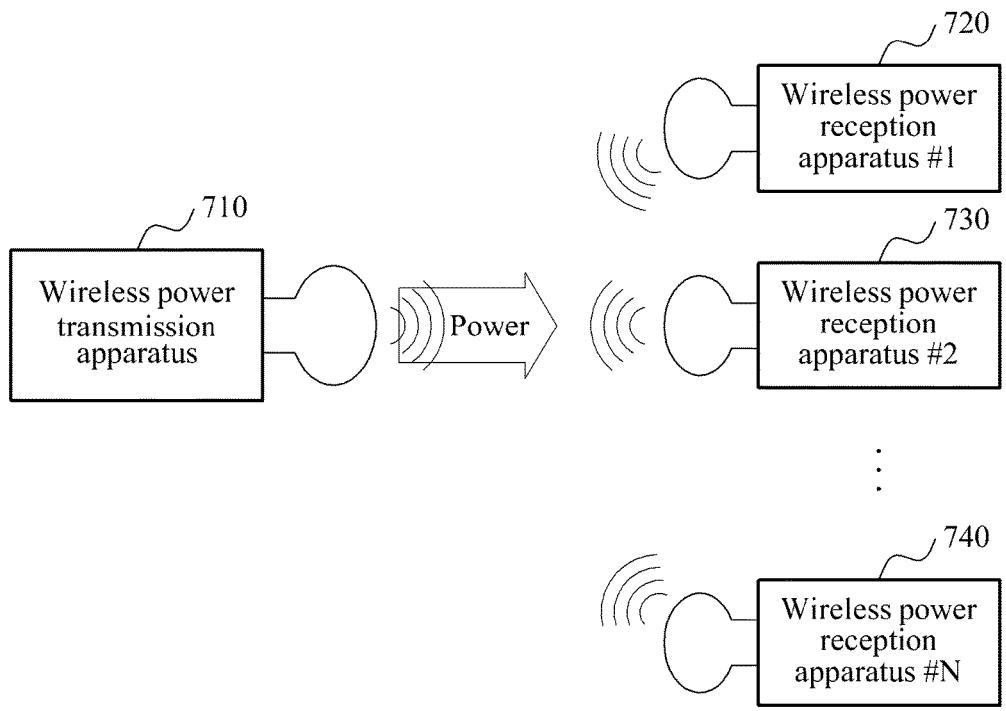
FIG. 7 illustrates an example of a multi-device communication environment.

FIG. 7 illustrates an example of a multi-device communication environment.

Referring to FIG. 7, a wireless power transmission and reception system includes a single wireless power transmission apparatus 710 and a plurality of wireless power reception apparatuses 720 to 740.

Each of the plurality of wireless power reception apparatuses sets information associated with a reference power based on information associated with a predetermined required power, and measures, at an input terminal of a DC/DC converter, received information associated with a power. In this example, the information associated with the reference power may include any one or any combination of a reference power, a reference voltage, and a reference current, and the information associated with the amount of power measured may include any one or any combination of an amount of power measured, an amount of voltage measured, and an amount of current measured.

The wireless power transmission apparatus 710 receives information associated with the reference power and the information associated with the amount of power measured from the plurality of wireless power reception apparatuses 720 through 740. The plurality of wireless power reception apparatuses 720 through 740 may have different reference powers. Accordingly, the wireless power transmission apparatus 710 may control an output power so that the reference power is equal to the amount of power measured for the plurality of wireless power reception apparatuses 720 through 740. As a result, the wireless power transmission apparatus 710 need not use additional information such as a distance from the wireless power reception apparatus, a change in a wireless power transmission efficiency, and a coupling coefficient, and may distribute a total power output to the plurality of wireless power reception apparatuses 720 through 740 based on the information associated with the reference power and the information associated with the amount of power measured.

Figure 8A:
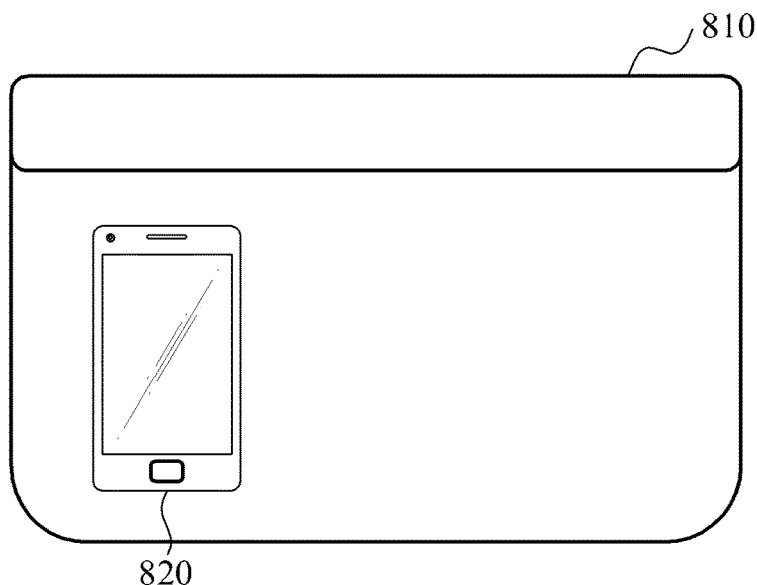
FIGS. 8A and 8B illustrate examples of a wireless power transmission apparatus and a wireless power reception apparatus.
Figure 8B:
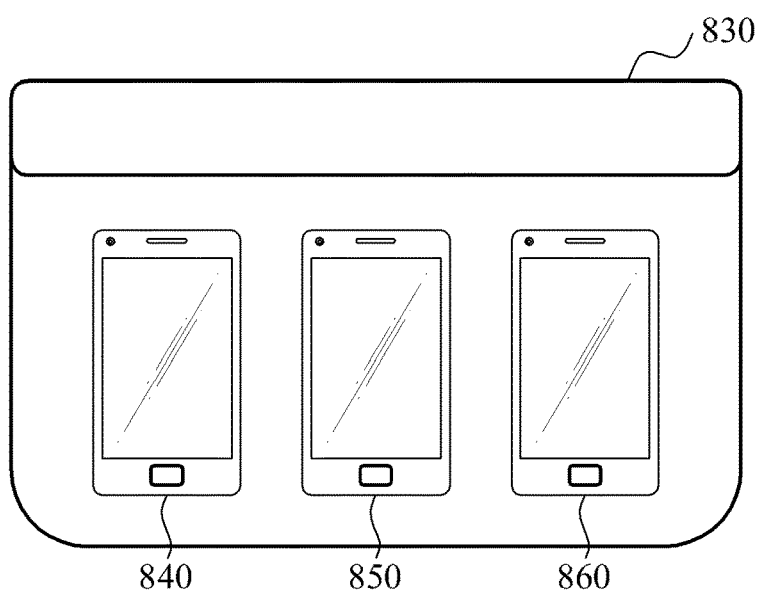

FIGS. 8A and 8B illustrate examples of a wireless power transmission apparatus and a wireless power reception apparatus.

FIG. 8A illustrates an example of wireless power charging between a pad 810 and a single mobile terminal 820, and FIG. 8B illustrates an example of wireless power charging between a pad 830 and a plurality of mobile terminals 840 through 860.

In FIG. 8A, the pad 810 receives from the mobile terminal 820 information associated with a reference power of the mobile terminal 820 and information associated with an amount of power measured at an input terminal of a DC/DC converter of the mobile terminal 820. The pad 810 controls a power output to the mobile terminal 820 based on the information associated with the reference power and the information associated with the amount of power measured received from the mobile terminal 820.

The pad 810 may charge one or more additional mobile terminals while charging the mobile terminal 820.

In FIG. 8B, the pad 830 additionally charges the mobile terminals 850 and 860 while charging the mobile terminal 840. The pad 830 receives information associated with a reference power and information associated with an amount of power measured from the mobile terminals 850 and 860 while charging the mobile terminal 840, and controls power output to the mobile terminals 850 and 860 based on the information associated with the reference power and the information associated with the amount of power measured from the mobile terminals 850 and 860. Accordingly, the pad 830 distributes a total output power to the plurality of mobile terminals 840 through 860. When charging of the mobile terminal 840 is completed, the pad 830 may suspend charging of the power output to the mobile terminal 840, and distribute the total output power to the plurality of mobile terminals 850 and 860 by coordinating the total output power.

Figure 9:
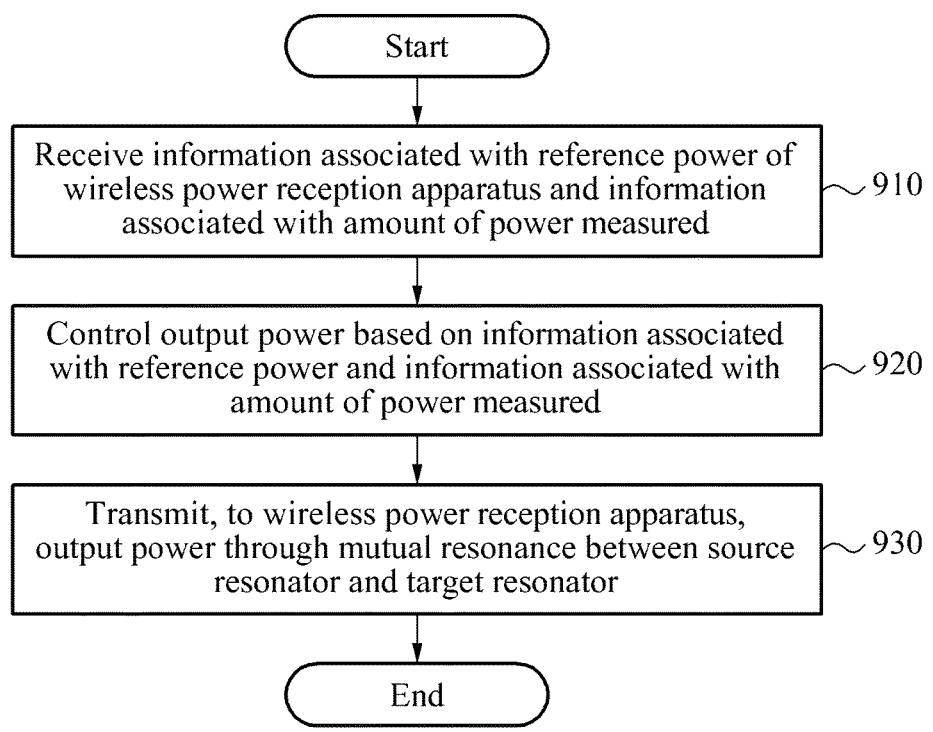
FIG. 9 illustrates an example of a wireless power transmission method.

FIG. 9 illustrates an example of a wireless power transmission method.

Referring to FIG. 9, in 910, the wireless power transmission method includes receiving information associated with a reference power of a wireless power reception apparatus and information associated with an amount of power measured at an input terminal of a DC/DC converter included in the wireless power reception apparatus.

Also, in 920, the wireless power transmission method includes controlling an output power based on the information associated with the reference power and the information associated with the amount of power measured.

In 930, the wireless power transmission apparatus includes transmitting, to the wireless power reception apparatus, the output power through mutual resonance with a target resonator.

Descriptions of FIGS. 1 through 8B are also applicable to the wireless power transmission method illustrated in FIG. 9, and thus repeated descriptions will be omitted here for conciseness.

The Tx controller 114, the communicators 115 and 124, and the Rx controller 125 in FIG. 1, the power information measurer 560, the controller 570, and the communicator 580 in FIG. 5, and the controller 640 and the communicator 650 in FIG. 6, that perform the various operations described with respect to FIGS. 2A, 2B, 3A, 3B, 4A, 4B, 7, 8A, 8B, and 9 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
    a communication unit configured to receive information associated with a reference power of a wireless power reception apparatus and information associated with an amount of power measured at an input terminal of a direct current-to-direct current (DC/DC) converter of the wireless power reception apparatus;
    a controller configured to control an output power based on the information associated with the reference power and the information associated with the amount of power measured; and
    a source resonator configured to transmit the output power to the wireless power reception apparatus by resonating with a target resonator,
    wherein the information associated with the reference power comprises information associated with a reference voltage and a reference current,
    wherein the information associated with the amount of power measured comprises information associated with a measured voltage and a measured current, and
    wherein the controller comprises:
        an output voltage controller configured to control an output voltage so that the reference voltage is equal to the measured voltage; and
        an output current controller configured to control an output current so that the reference current is equal to the measured current.

2. The apparatus of claim 1, wherein the controller is further configured to control the output power so that the reference power is equal to the amount of power measured.

3. The apparatus of claim 1, wherein:
    there are a plurality of wireless power reception apparatuses; and
    the controller is further configured to distribute a total power output to the plurality of wireless power reception apparatuses based on the information associated with the reference power and the information associated with the amount of power measured received from each of the plurality of apparatuses.

4. The apparatus of claim 1, wherein the information associated with the amount of power measured is measured between a rectifier of the wireless power reception apparatus and the DC/DC converter.

5. The apparatus of claim 1, wherein the controller is configured to:
    compare the reference power with the amount of power measured; and
    control the output power based on the comparison.

6. The apparatus of claim 1, wherein:
    the communication unit is configured to receive information associated with an operating efficiency of the wireless power reception apparatus;
    the information associated with the operating efficiency of the wireless power reception apparatus comprises the information associated with the reference power and the information associated with the amount of power measured; and
    the controller is configured to control the output power to increase the operating efficiency of the wireless power reception apparatus based on the information associated with the operating efficiency of the wireless power reception apparatus.

7. The apparatus of claim 1, wherein the controller further configured to maintain the output power when the reference power is equal to the amount of power measured and control the output power so that the reference power is equal to the amount of power measured when the reference power is not equal to the amount of power measured.

8. A wireless power transmission method comprising:
receiving information associated with a reference power of a wireless power reception apparatus and information associated with an amount of power measured at an input terminal of a direct current-to-direct current (DC/DC) converter of the wireless power reception apparatus;
controlling an output power based on the information associated with the reference power and the information associated with the amount of power measured; and
transmitting the output power to the wireless power reception apparatus by resonating with a target resonator,
wherein the information associated with the reference power comprises information associated with a reference voltage and a reference current,
wherein the information associated with the amount of power measured comprises information associated with a measured voltage and a measured current, and
wherein the controlling comprises controlling an output voltage so that the reference voltage is equal to the measured voltage and controlling an output current so that the reference current is equal to the measured current.

9. The method of claim 8, wherein the information associated with the amount of power measured is measured between a rectifier of the wireless power reception apparatus and the DC/DC converter.

10. The method of claim 8, wherein there are a plurality of wireless power reception apparatuses; and
the controlling of the output power comprises distributing a total power output to the plurality of wireless power reception apparatuses based on the information associated with the reference power and the information associated with the amount of power measured received from each of the plurality of wireless power reception apparatuses.

* * * * *